E. A. JOHNSON.
ELECTRICAL TEST SET.
APPLICATION FILED APR. 22, 1919.

1,348,424.

Patented Aug. 3, 1920.
2 SHEETS—SHEET 2.

Inventor
EUGENE A. JOHNSON
By E. E. Sauzé
Attorney.

UNITED STATES PATENT OFFICE.

EUGENE A. JOHNSON, OF WALLA WALLA, WASHINGTON.

ELECTRICAL-TEST SET.

1,348,424. Specification of Letters Patent. Patented Aug. 3, 1920.

Application filed April 22, 1919. Serial No. 291,974.

*To all whom it may concern:*

Be it known that I, EUGENE A. JOHNSON, a citizen of the United States, residing at Walla Walla, in the county of Walla Walla and State of Washington, have invented certain new and useful Improvements in Electrical-Test Sets, of which the following is a specification.

My invention relates to that class of instruments used for testing electric systems and pertains to instruments used for measuring the potential of electricity.

One object of this invention is to provide a means whereby the voltage or amperage of electricity flowing through a certain system, may be conveniently measured, the one independent of the other, whether constituting the charge or discharge of storage batteries, the flow to or from generators or motors, or in light systems or grounds.

A further object is to provide improved switching mechanism and circuit arrangement whereby a suitable measuring instrument may be readily and conveniently applied to electrical systems for test purposes, and the instrument safeguarded and protected against a harmful current flow.

A further object is to provide a system of wiring in combination with a self contained volt meter having one or more ranges, whereby either a volt or ampere reading may be accomplished upon one instrument by a simple switching mechanism.

That the invention may be better understood reference is now had to the accompanying drawings, in which—

Figure 1 shows the wiring diagram of the device;

Fig. 2 an end elevation of the six-bladed two-throw switch and the two-throw safety switches;

Figure 1:
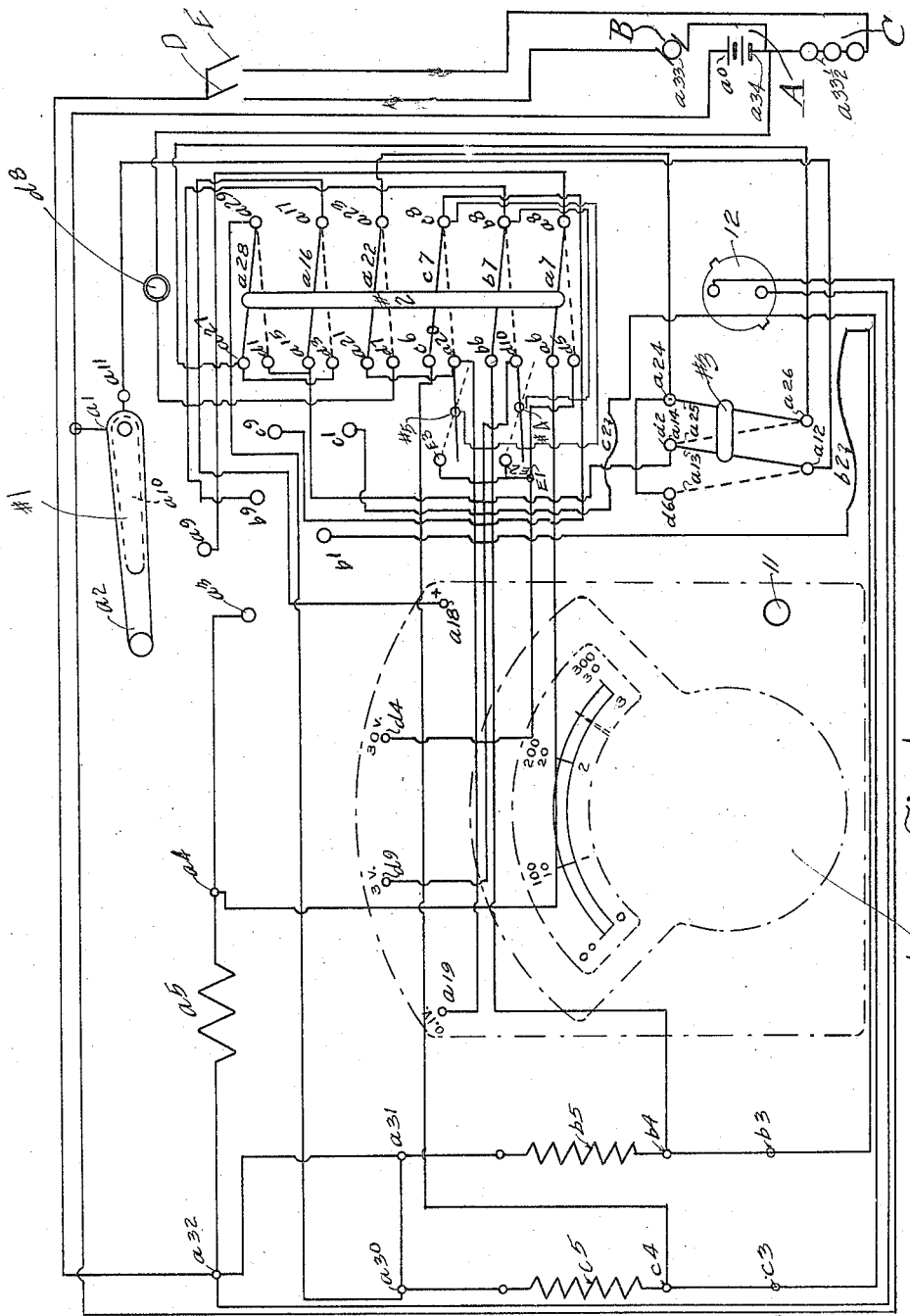
Figure 3:
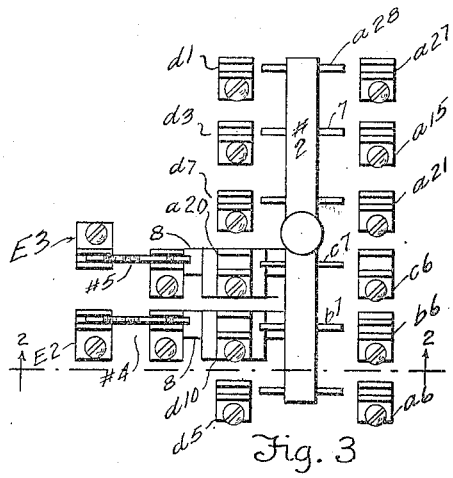
Fig. 3 is a plan view of the six-bladed two-throw switch and the two-throw safety switches.

In the drawings, A represents the storage battery of any automobile electric starting and lighting system, with B representing a generator which supplies the battery A and the lights C with electricity.

In testing for any trouble which may arise in the system it is obvious that one circuit only can be tested at the same time; therefore switches D and E are interposed in the generator and light circuit respectively that these circuits may be cut out when desired.

Figure 4:
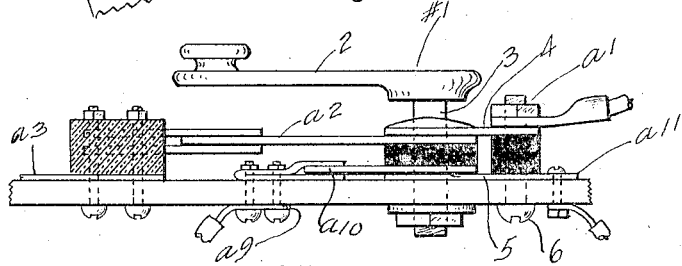
Fig. 4 is an elevation of the two-circuit-sliding switch.

In the instrument improved switching mechanisms are utilized which will now be described as follows:

A two circuit sliding switch #1, Fig. 4, consists of a lever arm 2 attached to a shank 3, to which is attached the blades $a^2$ and $a^{10}$; this shank is insulated from the blade $a^2$ and $a^{10}$ in the usual manner, the insulation being attached to the shank and carrying the said blades $a^2$ and $a^{10}$ respectively. Above the blade $a^2$, and in electrical contact therewith, is the plate 4 which is connected to the post $a^1$. A similar plate 5 connects the blade $a^{10}$ and the post $a^{11}$ and is held in place by the bolt 6 which also holds the plate 4, the two plates being insulated apart. The blades $a^2$ and $a^{10}$ move in unison and connect the posts $a^3$ and $a^1$, at the same time connecting the posts $a^9$ and $a^{11}$ respectively; the blades will also connect the posts $b^1$ and $a^1$, and $b^9$ and $a^{11}$, and also connect posts $c^1$ and $a^1$, and $c^9$ and $a^{11}$, by the proper manipulation.

A six bladed two throw switch #2, having in connection therewith two safety two throw switches #4 and #5 respectively. This six bladed two throw switch is preferably of the design shown, although a standard switch may be used if the necessary changes are made therein. In the preferred form as shown the blades $a^{28}$, etc. have projecting pieces 7 to engage electrically with the posts $a^{27}$ and $D^1$, etc., as desired.

All posts on either side of the blades are designed to receive the blades snugly, thereby making good electrical contact, with the exception of posts $d^{10}$ and $a^{20}$ which are designed to have a space of double the width, to receive two blades before contact is made, as follows: Post $d^{10}$ will receive the blade $b^7$ and the blade of the #4 safety switch, and post $a^{20}$ will receive the blade $c^7$ and the blade of the #5 safety switch.

Figure 6:
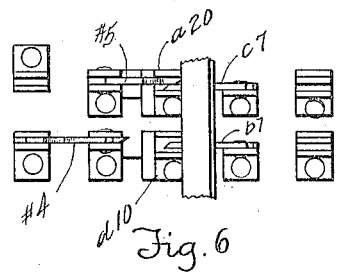
Fig. 6 is a plan view of the six-bladed two-throw switch with part broken away and showing the safety switch #5 in contact therewith.

The projecting piece 7 enters the post approximately centrally. This is shown in Fig. 6 where blade $b^7$ is shown in post $d^{10}$ with the blade of #4 safety switch out of contact and shows that without the blade of the #4 switch entering post $d^{10}$ with the blade $b^7$ that no contact is made between them at this point. By referring to the position of the #5 switch, in Fig. 6, we note that the blades here are in contact; blade $c^7$ being forced against the wall of the post $a^{20}$ by the blade of the #5 switch, which is also in firm contact with the opposite wall of this post. The two blades are electrically connected by the bar 8. A tongue 9 projects from the blades of the safety switches and these blades are restored to their normal position out of contact by means of the spring 10 being released by moving the #2 switch to the right, relieving the frictional resistance which holds the #4 and #5 switch blades in place during contact.

Figure 2:
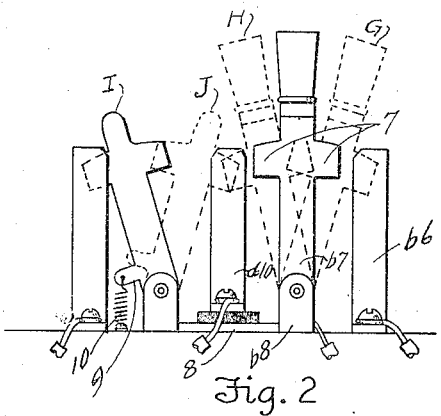
Figure 5:
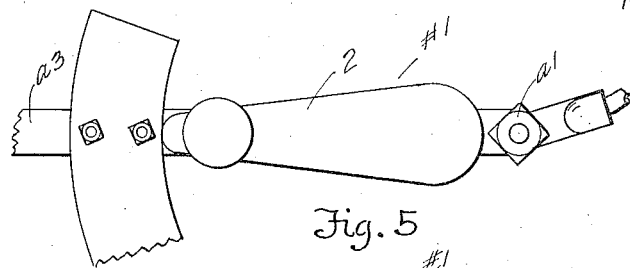
Fig. 5 is a plan view of the two-circuit sliding switch.

Different positions of the respective blades are shown by the dotted lines in Fig. 2 and will be referred to in describing the course of the electricity through the instrument.

The polarity switch #3 is of the usual knife blade variety and needs no further description.

In Fig. 1 #6 is a self contained volt meter having one or more ranges and is represented by broken and dotted lines rather than the conventional form, as by this representation the location of the posts of the instrument, and the three ranges (as shown in this case) as shown on the dial, are more plainly represented. On the instrument is the usual indication button 11.

The necessary shunts $a^5$, $b^5$ and $c^5$ are conveniently located, as are the fuses $b^2$ and $c^2$.

A single wire socket $d^8$ is placed as a terminal of the wiring in the instrument, and from this socket a flexible cord is used to connect into the circuit to be tested, in the drawing being shown as connected to the battery.

A two wire socket 12 is connected into the line and is used to accommodate an auxiliary lead of light, flexible cord which will be required in testing circuits at some distance from the instrument.

Testing for amperage is required for ascertaining the flow of electrical energy through a battery during the process of recharging, or the flow of electrical energy out of a battery when discharging through an electrical motor or lighting circuit.

Testing for voltage is required for ascertaining the rise of electrical energy in volts during the process of recharge, or for testing the drop of electrical energy during discharge, or for actual voltage of battery in a normal condition.

In making ampere test six blade two throw switch #2 is placed in position G, see Fig. 2.

*Test "A."*

Test for amperage through 300 ampere circuit as follows:

In describing the flow of electrical energy, start at positive post of battery $a^0$, follow to post $a^1$ through blade $a^2$ of two circuit switch #1, to post $a^3$, to post $a^4$; the resistance in shunt $a^5$ forces a part of current to post $a^6$ on six blade double throw switch #2, through blade $a^7$, to post $a^8$, to post $a^9$, through blade $a^{10}$, which is insulated from blade $a^2$ of two circuit switch #1 to post $a^{11}$, to post $a^{12}$, through blade $a^{13}$ of polarity switch #3 to post $a^{14}$, to post $a^{15}$, through blade $a^{16}$ of switch #2 to post $a^{17}$, to positive post of instrument $a^{18}$, through instrument to post $a^{19}$, to post $a^{20}$, to post $a^{21}$, through blade $a^{22}$ of switch #2 to post $a^{23}$, to post $a^{24}$, through blade $a^{25}$ of polarity switch #3, to post $a^{26}$, to post $a^{27}$, through blade $a^{28}$, of switch #2 to post $a^{29}$, to post $a^{30}$, to post $a^{31}$, to post $a^{32}$, through switch D or E respectively, through motor generator or light circuit shown as $a^{33}$ and $a^{33\frac{1}{2}}$ to negative post of battery at $a^{34}$, completing the circuit and giving reading on 0—100—200—300 scale of instrument.

*Test "B."*

Test for amperage through 30 ampere circuit as follows:

The flow of electrical energy will be the same as in Test "A" to post $a^1$. The two circuit switch #1 is now moved to post $b^1$, current then flows from post $a^1$ through blade $a^2$ of switch #1 to post $b^1$, to 30 ampere fuse $b^2$, to post $b^3$, post $b^4$, the resistance in shunt $b^5$ forces a part of current to post $b^6$ through blade $b^7$ of switch #2, to post $b^8$, to post $b^9$, through blade $a^{10}$ of switch #1, and then follows the rest of circuit as described in Test "A," completing the circuit and giving reading on 0—10—20—30 scale of instrument.

*Test "C."*

Test for amperage through 3 ampere circuit as follows:

The flow of electrical energy will be the same as in test "A," to post $a^1$. The two circuit switch #1 is now moved to post $c^1$, current then flows to post $a^1$ through blade $a^2$ of switch #1 to post $c^1$, to 3 amp. fuse $c^2$, to post $c^3$, to post $c^4$, the resistance in shunt $c^5$ forces a part of current to post $c^6$, through blade $c^7$ of switch #2, to post $c^8$, to post $c^9$, through blade $a^{10}$ of switch #1, and then follows the rest of circuit as described in Test "A," completing the circuit and giving reading on 0—1—2—3 scale of instrument.

In making voltage tests the six blade two throw switch #2 is placed in the position H, see Fig. 2.

We will now describe the voltage test through the 30 volt circuit.

Beginning at the positive post $a^0$ of the battery, the course of the current flow will be to post $a^1$, blade $a^2$, of two circuit switch #1, post $a^3$, post $a^4$, through shunt $a^5$, post $a^{32}$, post $a^{31}$, post $a^{30}$, post $a^{29}$, through blade $a^{28}$ of switch #2, to post $d^1$, to post $a^{15}$, to post $a^{14}$, to post $d^2$, through blade $a^{25}$ of switch #3, to post $a^{26}$, to post $a^{27}$, to post $d^3$, through blade $a^{16}$ of switch #2, to post $a^{17}$, positive post of instrument $a^{18}$, through instrument to post $d^4$, to post $d^5$. From this course a branch lead is run to safety switches #4 and #5 respectively, from the point $E^1$, and will be hereinafter explained. Thence through blade $a^7$ of switch #2, to post $a^8$, to post $a^9$, through blade $a^{10}$ of switch #1, to post $a^{11}$, to post $a^{12}$, through blade $a^{13}$, to post $d^6$, to post $a^{24}$, to post $a^{23}$, through blade $a^{22}$ of switch #2, to post $d^7$, to post $d^8$, to negative post of battery $a^{34}$.

We will now describe the voltage test through the 3 volt circuit.

Beginning at the positive post $a^0$ of the battery, the course of the current flow will be to post $a^1$, through blade $a^2$ of switch #1, to post $b^1$, to fuse $b^2$, to post $b^3$, to post $b^4$, to shunt $b^5$, to post $a^{31}$, to post $a^{30}$, to post $a^{29}$, through blade $a^{28}$ of switch #2, to post $d^1$, to post $a^{15}$, to post $a^{14}$, to post $d^2$, through blade $a^{25}$ of switch #3, to post $a^{26}$, to post $a^{27}$, to post $d^3$, through blade $a^{16}$ of switch #2, to post $a^{17}$, to positive post of instrument $a^{18}$, through instrument to post $d^9$, to post $D^{10}$, through blade $b^7$ of switch #2, to post $b^8$, to post $b^9$, to post $a^{11}$, to post $a^{12}$, through blade $a^{13}$ of switch #3, to post $d^6$, to post $a^{24}$, to post $a^{23}$, through blade $a^{22}$ of switch #2, to post $d^7$, to post $d^8$, to negative post battery $a^{34}$.

On 0.1 volt circuit.

Beginning at positive post of battery $a^0$, to post $a^1$, through blade $a^2$ of switch #1, to post $c^1$, to fuse $c^2$, to post $c^3$, to post $c^4$, to shunt $c^5$, to post $a^{30}$, to post $a^{29}$, through blade $a^{28}$ of switch #2, to post $d^1$, to post $a^{15}$, to post $a^{14}$, to post $d^2$, through blade $a^{25}$, of switch #3, to post $a^{26}$, to post $a^{27}$, to post $d^3$, through blade $a^{16}$ of switch #2, to post $a^{17}$, to positive post of instrument $a^{18}$, through instrument $a^{19}$, to post $a^{20}$, through blade $c^7$ of switch #2, to post $c^8$, to post $c^9$, to post $a^{11}$, to post $a^{12}$, through blade $a^{13}$ of switch #3, to post $d^6$, to post $a^{24}$, to post $a^{23}$, through blade $a^{22}$ of switch #2, to post $d^7$, to post $d^8$, to negative post of battery $a^{34}$.

A branch lead leaves the line at $E^1$ and connects with switch posts $E^2$ and $E^3$ of safety switches #4 and #5 respectively; a circuit is thus complete through the safety switches #4 and #5, and with the blades in the position I, Fig. 2, through the 30 volt range of the instrument regardless of the position of two circuit sliding switch #1.

By this means the instrument is protected from a higher range current passing through a lower range circuit of the instrument, and thus a reading may be obtained on the 30 volt graduations, but should a finer reading be wanted on the finer graduations of the instrument the switches #4 or #5, as the case may be, must be thrown to position J.

This instrument is equally applicable for use with an instrument having a greater or less number of shunts by adding or subtracting the required number of circuits and increasing or decreasing the number of switch contacts.

I claim:

1. In an electrical test set, a current measuring instrument and its work circuit, a resistance interposed in said circuit, and a switch mechanism having means for connecting the resistance in parallel with the instrument when in one position, and in series with the instrument when in another position.

2. In an electrical test set, a current measuring instrument and its work circuit, a plurality of resistances interposed in said circuit, a switch for including any one of the resistances in the circuit and excluding the others, and a switch mechanism for connecting the selected resistance in parallel with the instrument when in one position, and in series with the instrument when in another position.

3. In an electrical test set, a current measuring instrument, a plurality of resistances of different ranges having circuit connections with the instrument, a switch for including any one of the resistances in the circuit of the instrument and for excluding the others, a switch mechanism having means for connecting the selected resistance in parallel and in series with the instrument, branch circuits normally connecting the circuits of the resistances of a lower range with the circuit of the resistance of higher range, and switches controlling the branch circuits.

4. In an electrical test set, a current measuring instrument, a plurality of resistances of different ranges having circuit connections with the instrument, a switch for including any one of the resistances in the circuit of the instrument and for excluding the others, a switch mechanism having means for connecting the selected resistance in parallel and in series with the instrument, branch circuits connected to the circuit of the resistance of higher range, and a switch mechanism having means for normally connecting the branch circuits to the resistances of lower range and for disconnecting the same.

5. In an electrical test set, a current measuring instrument, a plurality of resistances of different ranges having circuit connections with the instrument, a switch for including any one of the resistances in the circuit of the instrument and for excluding the others, a switch mechanism having means for connecting the selected resistance in parallel and in series with the instrument, branch circuits connected to the circuit of the resistance of higher range, and a switch mechanism having means for normally connecting the branch circuits to the resistances of lower range and for disconnecting the same, the aforesaid switch means which connect the selected resistances of lower range in series with the instrument having an electrical connection with the last-mentioned switch mechanism when the branch circuits are disconnected, to complete the connection of the selected resistances of lower range in series with the instrument.

6. In an electrical test set, a current measuring instrument, a plurality of resistances of different ranges having circuit connections with the instrument, a switch for including any one of the resistances in the circuit of the instrument and for excluding the others, a plurality of switch blades, a pair of contacts for each blade, the engagement of a switch blade with one contact connecting the selected resistance in parallel with the instrument, and the engagement of a blade with another contact connecting said resistance in series with the instrument, branch circuits connected to the circuit of the resistance of higher range, contacts to which the branch circuits lead and are connected, and switch blades normally engageable with the last-mentioned contacts, and electrically connected to the first-mentioned blades controlling the circuits of the resistances of lower range, the switch blades of the branch circuits being disengageable from the contacts of the latter, and engageable with the first-mentioned blades to complete the circuit connections of the resistances of lower range.

In testimony whereof I affix my signature.

EUGENE A. JOHNSON.